(12) United States Patent
Thulasiraman et al.

(10) Patent No.: US 11,704,205 B2
(45) Date of Patent: Jul. 18, 2023

(54) SYSTEMS AND METHODS FOR TRANSITIONING FROM LEGACY COMPUTER SYSTEMS

(71) Applicant: Verizon Patent and Licensing Inc., Arlington, VA (US)

(72) Inventors: Yoganand Thulasiraman, Irving, TX (US); Mary P. Jelinek, Somerset, NJ (US); Ramesh Babu Ramakrishnan, Flower Mound, TX (US); Elanchezhian Ganapathy Dhandapani, Frisco, TX (US); Abel Sileshi, Irving, TX (US); Venkata Ravi Sekhar Kothamasu, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 491 days.

(21) Appl. No.: 16/542,366

(22) Filed: Aug. 16, 2019

(65) Prior Publication Data
US 2021/0049080 A1   Feb. 18, 2021

(51) Int. Cl.
*G06F 11/20* (2006.01)
*G06N 20/00* (2019.01)

(52) U.S. Cl.
CPC .......... *G06F 11/203* (2013.01); *G06N 20/00* (2019.01); *G06F 2201/85* (2013.01)

(58) Field of Classification Search
CPC .............. G06F 11/203; G06F 2201/85; G06F 11/2048; G06F 11/2038; G06F 11/1641; G06F 2201/81; G06N 20/00
See application file for complete search history.

(56) References Cited

U.S. PATENT DOCUMENTS

| | | | | |
|---|---|---|---|---|
| 6,192,093 B1* | 2/2001 | Lai | ......... | H04L 7/041 375/295 |
| 7,532,568 B1* | 5/2009 | Boudreaux | ......... | H04W 24/04 370/217 |
| 8,219,674 B2* | 7/2012 | Rieger | ......... | H04L 67/327 709/224 |
| 8,881,139 B1* | 11/2014 | Acacio | ......... | G06F 8/76 717/177 |
| 10,187,082 B1* | 1/2019 | Tee | ......... | H03M 13/03 |
| 10,324,782 B1* | 6/2019 | Dorfman | ......... | G06F 11/0727 |
| 10,740,156 B1* | 8/2020 | Kumar | ......... | G06F 9/5027 |

(Continued)

*Primary Examiner* — Matthew M Kim
*Assistant Examiner* — Matthew N Putaraksa

(57) ABSTRACT

A method may include receiving a communication from a user device, determining whether to forward the communication to a first computer system or a second computer system and forwarding the communication to the first computer system based on the determining. The method may also include generating, by the first computer system, a first response to the communication, determining whether an error occurred when processing the communication at the first computer system and forwarding the communication to the second computer system, in response to determining that an error occurred. The method may further include generating, by the second computer system, a second response to the communication and comparing the first response from the first computer system to the second response from the second computer system.

20 Claims, 7 Drawing Sheets

(56) References Cited

U.S. PATENT DOCUMENTS

| | | | |
|---|---|---|---|
| 2005/0036795 A1* | 2/2005 | Karagiannis | G03G 21/1676 399/27 |
| 2005/0036800 A1* | 2/2005 | Karagiannis | G03G 21/1652 399/109 |
| 2007/0234113 A1* | 10/2007 | Komatsu | G06F 11/201 714/6.13 |
| 2008/0091990 A1* | 4/2008 | Bruce | G11C 29/021 714/721 |
| 2010/0095276 A1* | 4/2010 | Ottavi | G06F 11/3672 717/125 |
| 2010/0235676 A1* | 9/2010 | Aboel-Nil | G06F 11/2002 714/4.1 |
| 2011/0314165 A1* | 12/2011 | Maes | H04L 67/148 709/227 |
| 2012/0191645 A1* | 7/2012 | Koike | G06F 16/2379 707/610 |
| 2012/0210162 A1* | 8/2012 | Gara | G06F 11/1064 714/6.1 |
| 2013/0024721 A1* | 1/2013 | Kabulepa | G06F 11/165 714/5.1 |
| 2013/0159499 A1* | 6/2013 | Besehanic | H04L 61/2007 709/224 |
| 2015/0020202 A1* | 1/2015 | Giuliani | H04L 63/18 726/24 |
| 2015/0254163 A1* | 9/2015 | Baril | G06F 11/3452 714/38.1 |
| 2016/0063397 A1* | 3/2016 | Ylipaavalniemi | G06N 20/00 706/12 |
| 2017/0141953 A1* | 5/2017 | Vulich | H04L 69/40 |
| 2017/0171304 A1* | 6/2017 | Niu | H04L 67/02 |
| 2017/0270000 A1* | 9/2017 | Gao | G06F 3/0604 |
| 2018/0246794 A1* | 8/2018 | Baty | G06F 11/3037 |
| 2019/0146754 A1* | 5/2019 | Mody | G06F 16/955 707/690 |
| 2020/0065779 A1* | 2/2020 | Azar | G06Q 20/027 |
| 2020/0097841 A1* | 3/2020 | Petousis | G06N 5/04 |
| 2020/0219489 A1* | 7/2020 | Stephenson | G06F 40/30 |
| 2020/0234109 A1* | 7/2020 | Lee | G06Q 10/107 |
| 2021/0042644 A1* | 2/2021 | Blanton | G06F 11/0751 |
| 2021/0132926 A1* | 5/2021 | Wangikar | G06F 8/60 |
| 2021/0191799 A1* | 6/2021 | Valvassori | G05B 23/024 |
| 2021/0209512 A1* | 7/2021 | Gaddam | G06N 20/10 |
| 2021/0248042 A1* | 8/2021 | Sundaram | G06F 11/1461 |
| 2021/0299808 A1* | 9/2021 | Van Sprang | G05B 19/406 |

* cited by examiner

| CATEGORY CODE | ACTIVE | LEGACY COMPARE | FAILOVER THRESHOLD | ERROR COUNT | DESCRIPTION |
|---|---|---|---|---|---|
| 8 | ON | ON | 2 | 1 | DATA NOT FOUND |
| 100 | ON | ON | 10 | 3 | UNEXPECTED ERROR |
| 320 | ON | OFF | 30 | 5 | SERVICE VALIDATION |
| 8092 | ON | ON | 7 | 0 | EXTERNAL RESOURCE |
| ... | ... | ... | ... | ... | |

FIG. 6

SYSTEMS AND METHODS FOR TRANSITIONING FROM LEGACY COMPUTER SYSTEMS

BACKGROUND INFORMATION

Customers typically interface with companies in a number of different ways, such as via telephone calls, web-based communications, in-store visits, etc. As a result, companies typically provide a number of different interfaces and/or platforms that are able to handle the incoming communications and requests. In many instances, such interfaces are coupled to a legacy computer system that receives requests for information, customers' orders, etc. The legacy computer system may then process the requests and/or orders.

When upgrading from a legacy computer system to a new system, such as a cloud-based computer system that is able to process customers' communications/requests, a company must ensure that the new system is able to take over processing of all incoming communications before terminating use of the legacy computer system. Such changeovers to a new system are very difficult to implement and often create many customer-service related problems. As a result, companies often delay replacing legacy computer systems to avoid such problems.

BRIEF DESCRIPTION OF THE DRAWINGS

FIG. 6 is an exemplary datastore used in accordance with an exemplary implementation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to transitioning from a legacy computer system to a new computer system, such as a cloud-based computer system. In an exemplary implementation, communications formerly handled by the legacy computer system may be forwarded to the cloud-based computer system using the same procedures as used when forwarding communications to the legacy system. For example, a front end platform that receives communications from users may use the same application programming interface (API) calls when forwarding communications to both the legacy system and new cloud-based system. Using the same procedures at the front end (e.g., the same API calls) enables the front end interfaces that receive communications to easily transition to the new cloud-based system without completely removing access to the legacy system, thus allowing for "production environment" testing.

In accordance with an exemplary implementation, a verification system may be used to ensure that output/results associated with incoming communications processed by the cloud-based system meet certain error and/or throughput thresholds. In addition, in some implementations, output generated by the cloud-based system may also be processed by the legacy system to determine whether the cloud-based system is operating properly and/or operating at least as well as the legacy system. In this manner, if problems occur at the new cloud-based system, the entity/company associated with cloud-based system may be aware of problems. In addition, if problems occur at the cloud-based system, the entity operating the cloud-based system and legacy system may also be provided an option for automatically switching back to using the legacy computer system. Still further, in some implementations, the cloud-based system may be tested in a parallel "off-line" mode before transitioning to handling communications for customers in a "live" mode. This may further ensure that the cloud-based system is operating properly before transitioning from the legacy system.

Figure 1:
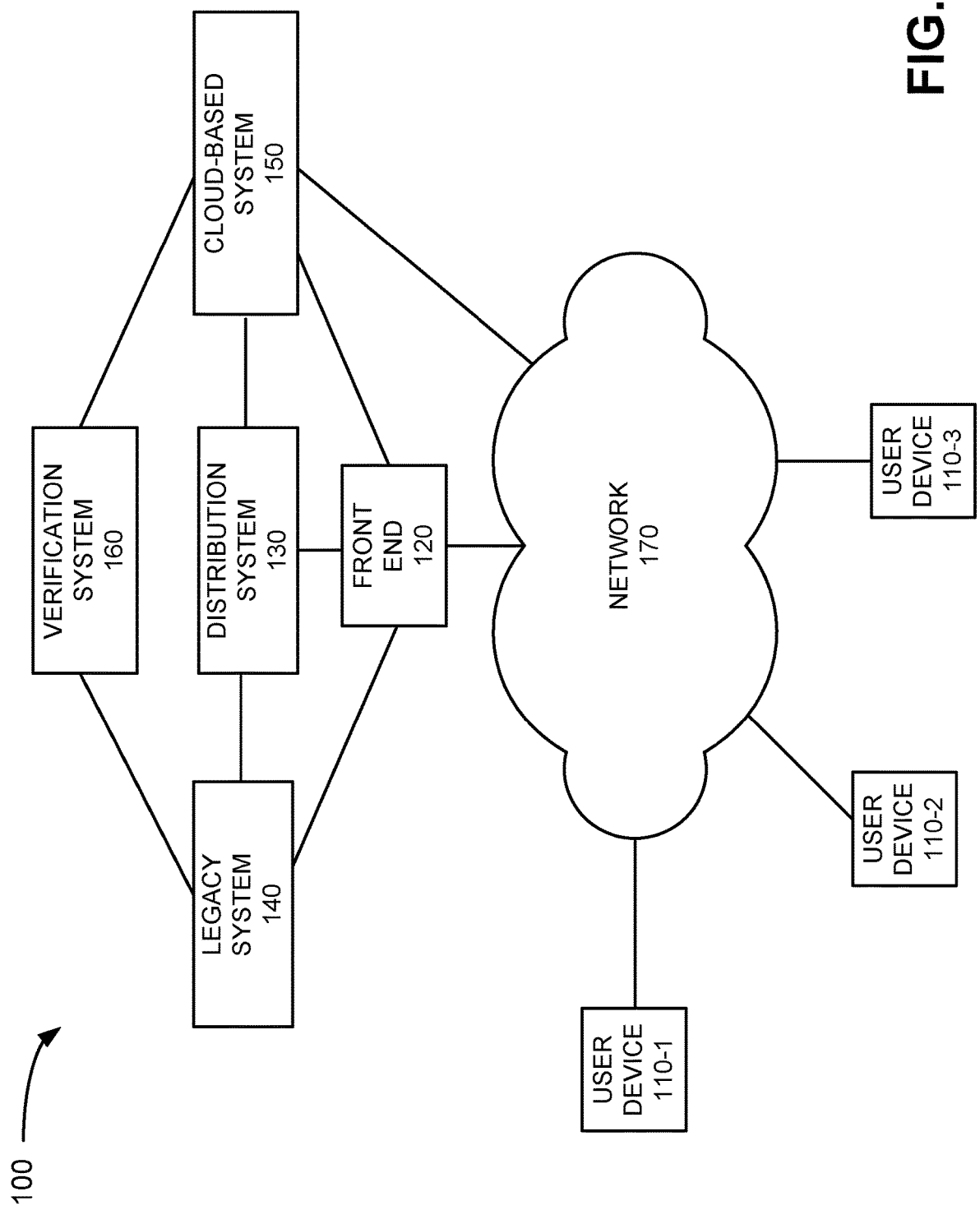
FIG. 1 illustrates an exemplary environment in which systems, devices and methods described herein may be implemented.

FIG. 1 is a block diagram of an exemplary environment 100 in which systems and methods described herein may be implemented. Environment 100 may include user devices 110-1 through 110-3, front end 120, distribution system 130, legacy system 140, cloud-based system 150, verification system 160 and network 170.

User devices 110-1 through 110-3 (referred to individually as user device 110-*x* or 110 and collectively as user devices 110) may each include a mobile device, such as wireless or cellular telephone device (e.g., a conventional cell phone with data processing capabilities), a smart phone, a personal digital assistant (PDA) that can include a radio-telephone, etc. User devices 110 may also include any type of computer device or system, such as a personal computer (PC), a laptop, a tablet computer, a notebook, a netbook, a wearable computer (e.g., a wrist watch, eyeglasses, etc.), a printer, an email server, a game playing device, a music playing device, a television, a home appliance device, a home monitoring device, a camera, etc. User devices 110 may further include Internet of Things (IoT) devices or "smart" devices, such as sensors, actuators, home automation devices, etc., that may include communication functionality. For example, IoT devices may include machine type communication (MTC) devices that communicate wirelessly with other devices over a machine-to-machine (M2M) interface.

User devices 110 may connect to network 170 and other devices in environment 100 via any conventional technique, such as wired, wireless, optical connections or a combination of these techniques. User device 110 and the person associated with user device 110 (e.g., the party holding or using user device 110, the owner of user device 110, etc.) may be referred to collectively as user device 110 in the description below.

Front end 120 may include one or more computing devices that acts as an interface to receive telephone calls, Internet-based communications, etc. In an exemplary implementation, front end 120 may include an interactive voice response (IVR) unit, automatic communication distributor and/or another type of intelligent interface that is able to receive communications and route the communications to the appropriate destinations. In other implementations, environment 100 may include multiple front ends 120 associated with different communication channels, such as web-based channels that provide different types of information and services to users, such as messaging services and external-facing application programming interfaces (APIs).

Distribution system 130 may include one or more computing devices that receive communications forwarded from front end 120. In an exemplary implementation, distribution system 130 may determine whether to forward the communication to legacy system 140 or cloud-based system 150. For example, depending on whether a particular service is enabled for processing by cloud-based system 150, distribution system 130 determines whether to forward the communication to legacy system 140 or cloud-based system 150. Further examples are described below.

Legacy system 140 may include a mainframe computer system or other computer system used to handle incoming communications for an entity/company. For example, legacy system 140 may handle communications received via telephone, the Internet, etc., and provide information of interest and/or services to the requester.

Cloud-based system 150 (also referred to herein as communication processing system 150) may include one or more computing devices that is able to handle communications from user devices 110. In an exemplary implementation, cloud-based system 150 includes a number of processing devices distributed over one or more locations accessible via a network, such as the Internet and/or a private network. Cloud-based system 150 may provide information, services and/or products to customers, such as customers associated with user devices 110. For example, cloud-based system 150 may be associated with a telecommunications services provider that provides television, Internet services, wireless communication services, etc., to customers. In an exemplary implementation, cloud-based system 150 may be a new system that a company is implementing to replace legacy system 140. In such an implementation, cloud-based system 150 may be tested to ensure that a switchover from legacy system 140 to cloud-based system 150 has no adverse effects, as described in detail below.

Verification system 160 may include one or more computing devices that is used to verify that communications processed by cloud-based system 150 meet certain requirements. For example, verification system 160 may ensure that cloud-based system 150 is providing/returning accurate information in response to the communications it receives—for example, that the number of errors and/or an error rate associated with cloud-based system 150 does not exceed one or more error thresholds. In one implementation, verification system 160 may compare results provided by cloud-based system 150 with results provided by legacy system 140 to ensure that cloud-based system 150 is functioning properly, as described in more detail below.

Network 170 may include one or more wired, wireless and/or optical networks that are capable of receiving and transmitting data, voice and/or video signals. For example, network 170 may include one or more public switched telephone networks (PSTNs) or other type of switched network. Network 170 may also include one or more wireless networks and may include a number of wireless stations (e.g., evolved NodeB (eNodeB), next generation NodeB (gNB), etc.) for receiving wireless signals and forwarding the wireless signals toward the intended destination. Network 170 may further include one or more satellite networks, one or more packet switched networks, such as an Internet protocol (IP) based network, a LAN, a WAN, a personal area network (PAN), a WiFi network, a Bluetooth network, an intranet, the Internet, or another type of network that is capable of transmitting data.

The exemplary configuration illustrated in FIG. 1 is provided for simplicity. It should be understood that a typical environment may include more or fewer devices than illustrated in FIG. 1. For example, environment 100 may include a large number (thousands or more) user devices 110 and multiple front ends 120, distribution systems 130, legacy systems 140, cloud-based systems 150, verification systems 160 and networks 170. In addition, environment 100 may include additional elements, such as switches, gateways, routers, monitoring devices, etc., that aid in routing data/communications to/from user devices 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
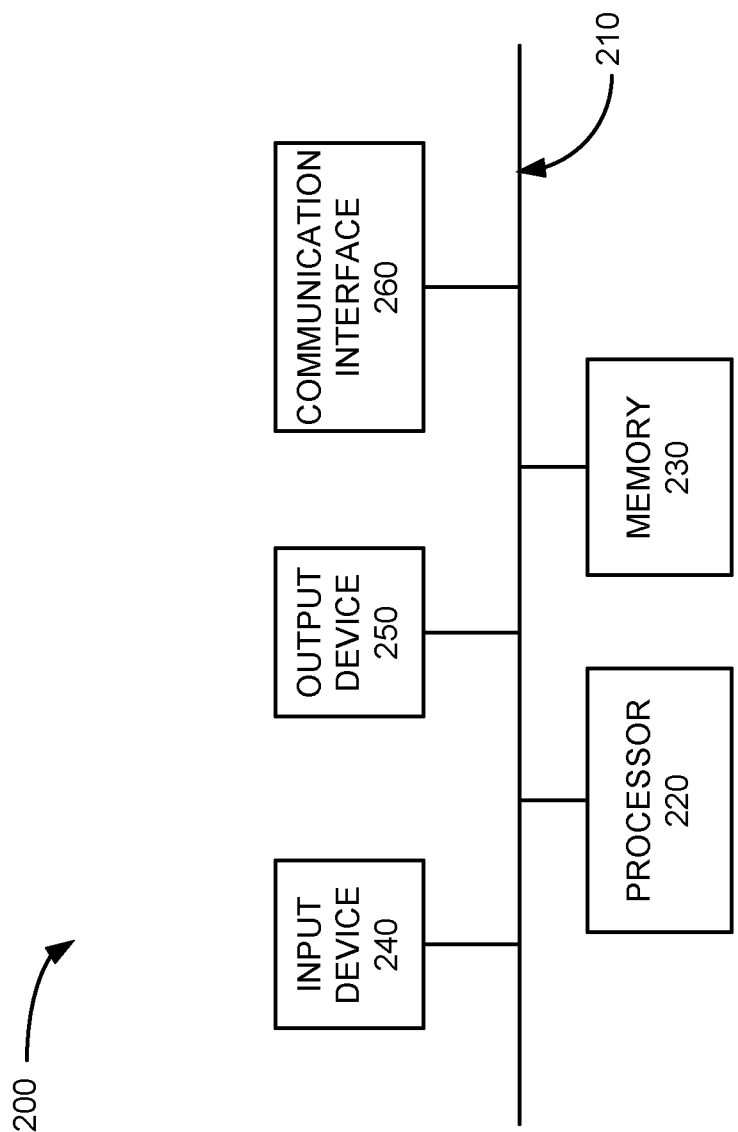
FIG. 2 illustrates an exemplary configuration of components implemented in one or more of the components of FIG. 1.

FIG. 2 illustrates an exemplary configuration of a device 200. Device 200 may correspond to one or more devices in environment 100, such as user device 110, front end 120, distribution system 130, legacy system 140, cloud-based system 150 and/or verification system 160. In addition, some of the devices in environment 100, such as front end 120, distribution system 130, legacy system 140, cloud-based system 150 and verification system 160, may include multiple devices 200. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that network device 200 uses to communicate with other devices in environment 100 via wired, wireless or optical mechanisms. For example, communication interface 260 may include one or more radio frequency (RF) transmitters, receivers and/or transceivers and one or more antennas for transmitting and receiving RF data via network 170 or another network, such as a private network. Communication interface 260 may also include a modem or an Ethernet interface to a LAN or other mechanisms for communicating with elements in environment 100.

The exemplary configuration illustrated in FIG. 2 is provided for simplicity. It should be understood that device 200 may include more or fewer devices than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
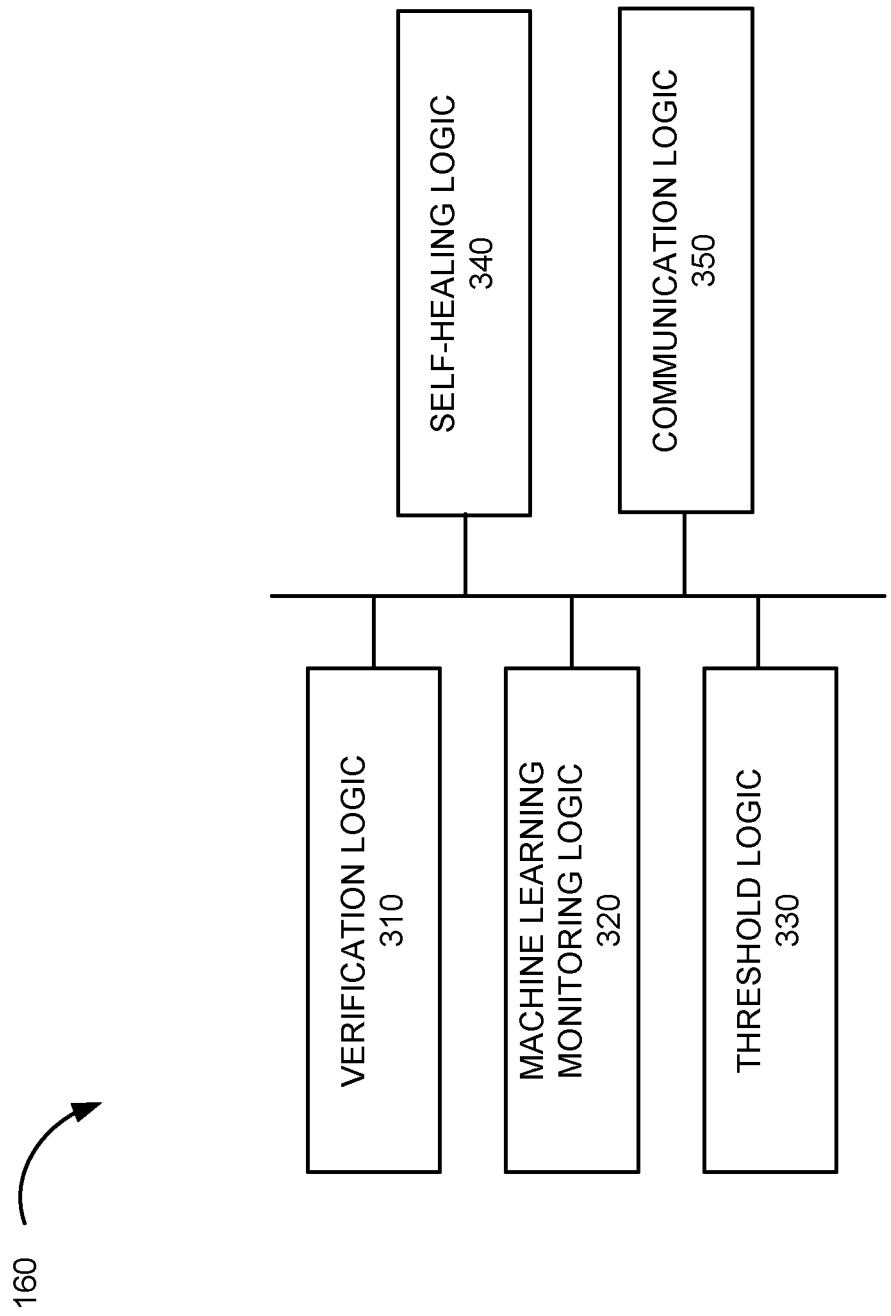
FIG. 3 illustrates an exemplary configuration of logic components included in the verification system of FIG. 1.

FIG. 3 is an exemplary functional block diagram of components implemented in verification system 160. In an exemplary implementation, all or some of the components illustrated in FIG. 3 may be implemented by processor 220 executing software instructions stored in memory 230.

Verification system 160 includes verification logic 310, machine learning monitoring logic 320, threshold logic 330, self-healing logic 340 and communication logic 350. In alternative implementations, these components or a portion of these components may be located in other components of environment 100, such as in cloud-based system 150.

Verification logic 310 may include logic to determine whether output from cloud-based system 150 meets certain requirements. For example, in one implementation, verification system 160 intercepts or receives output from cloud-based system 150. Verification system 160 may also forward communications/requests that were initially forwarded by distribution system 130 for processing by cloud-based system 150, to legacy system 140 for processing as well. Legacy system 140 then generates a response/output based on the communication and forwards the output to verification system 160. Verification logic 310 may then compare the output of cloud-based system 150 and legacy system 140 to determine if cloud-based system 150 is performing properly and/or at least as well as legacy system 140 with respect to generating output/responses to communications from user devices 110. In an exemplary implementation, verification logic 310 may include an extensible markup language (XML) tool to compare output from cloud-based system 150 and legacy system 140. In this implementation, verification logic 310 may compare output from cloud-based system 150 and legacy system 140 in an element-by element (e.g., a line by line manner), as described in more detail below.

Machine learning monitoring logic 320 may include logic that uses machine learning, such as convolutional neural networks, to determine whether to make changes with respect to error thresholds for communications processed by cloud-based system 150, provide additional error category thresholds associated with processing by cloud-based system, etc. For example, in one implementation, machine learning monitoring logic 320 may identify thresholds for certain types of errors, such as information not being found based on a query/input provided by the requester. Such an error may occur when the requester provides an incorrect identifier, such as an incorrect mobile telephone number. Machine learning monitoring logic 320 may analyze the errors over time and dynamically adjust error thresholds based on the type of error, type of service, type of client, time of day, etc. Dynamically adjusting the error thresholds may result in a more accurate determination of errors generated by cloud-based system 150, as well as possibly reducing the number of times in which it is determined that a switchover from cloud-based system 150 to legacy system 140 should occur based on an error count or rate.

Threshold logic 330 may include logic to determine whether cloud-based system 150 is operating within predetermined criteria. For example, threshold logic 330 may include one or more databases that stores thresholds, such as error thresholds associated with particular types of communications. Threshold logic 330 may use the threshold information (e.g., error threshold information) to determine whether output from cloud-based system 150 meets certain thresholds.

Self-healing logic 340 may include logic to determine whether to switch from cloud-based system 150 handling communications to having legacy system 140 handle communications. For example, when problems are detected by verification system 160, such as certain errors are greater than a threshold, self-healing logic 340 may signal distribution system 130 to begin forwarding communications to legacy system 140.

Communication logic 350 may include logic to transmit and receive information to/from other devices in environment 100. For example, communication logic 350 may transmit/receive communications to/from other devices in environment 100, such as legacy system 140 and cloud-based system 150. Communication logic 350 may also transmit messages/alerts, such as email messages, instant messages, etc., when problems are detected by verification system 160. For example, when a changeover needs to be implemented/has been implemented from cloud-based system 150 to legacy system 140, communication logic 350 may transmit email messages to the appropriate personnel.

Although FIG. 3 shows exemplary components of verification system 160, in other implementations, verification system 160 may include fewer components, different components, differently arranged components, or additional components than depicted in FIG. 3. In addition, functions described as being performed by one of the components in FIG. 3 may alternatively be performed by another one or more of the components of verification system 160.

Figure 4:
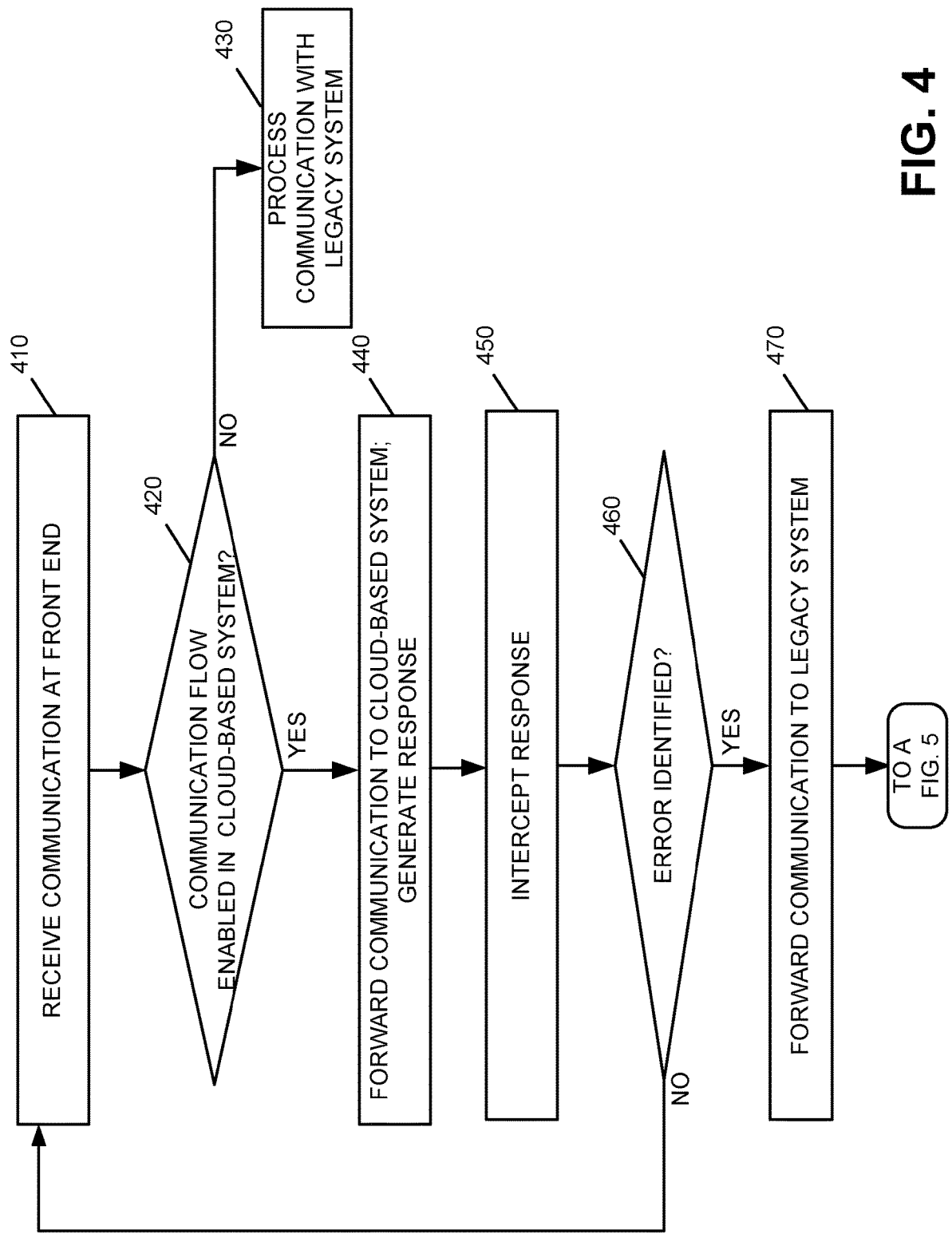
FIGS. 4 and 5 are flow diagrams illustrating processing by various components illustrated in FIG. 1 in accordance with an exemplary implementation.

FIG. 4 is a flow diagram illustrating processing associated with environment 100. Processing may begin with front end 120 receiving a communication (block 410), for example, originating at a user device 110. Front end 120 receives the communication and forwards the communication to distribution system 130. The communication may take the form of a hypertext transfer protocol (HTTP) request, a representational state transfer RESTful API call, a Simple Object Access Protocol (SOAP) message, a remote procedure call (RPC) message, or other form of interfacing message. Distribution system 130 may then determine if cloud-based system 150 is enabled to handle the communication flow associated with the received communication from user device 110-1 (block 420). For example, the company/entity associated with legacy system 140 may be in the process of replacing legacy system 140 with cloud-based system 150. In this scenario, the distribution system 130 may be configured to only allow certain types of communications, from front ends 120, and/or from certain user devices 110 to be sent for processing by cloud-based system 150.

If distribution system 130 determines that the communication flow is not enabled in cloud-based system 150 (block 420—no) distribution system 130 may forward the communication to legacy system 140 for processing (block 430). If distribution system 130 determines that the communication flow is enabled in cloud-based system 150 (block 420—yes), distribution system 130 may forward the communication to cloud-based system 150 for processing (block 440). For example, cloud-based system 150 may receive the communication from user device 110-1 and interact with the user device 110-1 to provide the requested information. In some implementations, the communication from user device 110 may be modified to conform to the requirements of cloud-based system 150, such as reformatting the communication to conform to API requirements of the cloud-based system 150 that differ from those of the legacy system 140. Cloud-based system 150 receives the communication, takes appropriate action and generates a response to the communication (block 440).

As an example, assume that a user is a customer of a wireless communications service provider and that the user wants to identify new service plans that are currently available through an online application provided by the service provider. In this case, the user may enter a user identifier, such as his/her mobile telephone number into a user interface provided by the online application and attempt to obtain information regarding various available wireless service plans. The request is communicated from the user's device 110-1 to front end system 120 and then to distribution system 130. Distribution system 130 reviews the request and determines, based on the type of request, the front end system 120 that sent the request and the user identifier provided with the request, that the request should be routed to cloud-based system 150. Cloud-based system 150 receives the communication from distribution system 130, and uses the user identifier to generate a response to the user's query regarding new service plans.

In some implementations, verification system 160 may intercept the response from cloud-based system 150 (block 450) and determine whether an error occurred at cloud-based system 150 while processing the query/request (block 460). For example, verification system 160 may intercept the response from cloud-based system 150 in real time and determine whether cloud-based system 150 was able to identify information regarding wireless service plans in response to the query from user device 110-1. If verification system 160 determines that cloud-based system 150 was able to correctly respond to the communication and that no error occurred during processing (block 460—no), processing may continue. For example, verification system 160 may provide (or instruct cloud-based system 150 to provide) the response to the front end 120, which may forward the results of the query generated by cloud-based system 150 to user device 110 and front end 120 may wait for a next communication at block 410.

If verification system 160 determines that an error occurred in response to the query (block 460—yes), verification system 160 may forward the communication to legacy system 140 for processing (block 470). For example, there may be certain responses that indicate an error has occurred in processing the communication, and validation system 160 may be configured to detect those responses. In an exemplary implementation, validation system 160 may use an extensible markup language (XML) tool to determine if an error occurred. For example, verification system 160 may examine XML output from cloud-based system 150 and, based on the output, identify the occurrence of an error or a potential error, such as no data found in response to the query. If an error or potential error is identified, verification system 160 may forward the original communication to legacy system 140 along with information indicating that the response from legacy system 140 should be provided to verification system 160. Legacy system 140 may then generate a response to the communication.

Continuing with the above example regarding a request for service plan information, if the response from cloud-based system 150 indicates that the user account was not found or some other error condition, verification system 160 may detect the error condition, and route the communication to legacy system 140 so it may attempt to identify information regarding the available service plans in response to the query from user device 110-1. Legacy system 140 may forward the response to the query to verification system 160.

Figure 5:
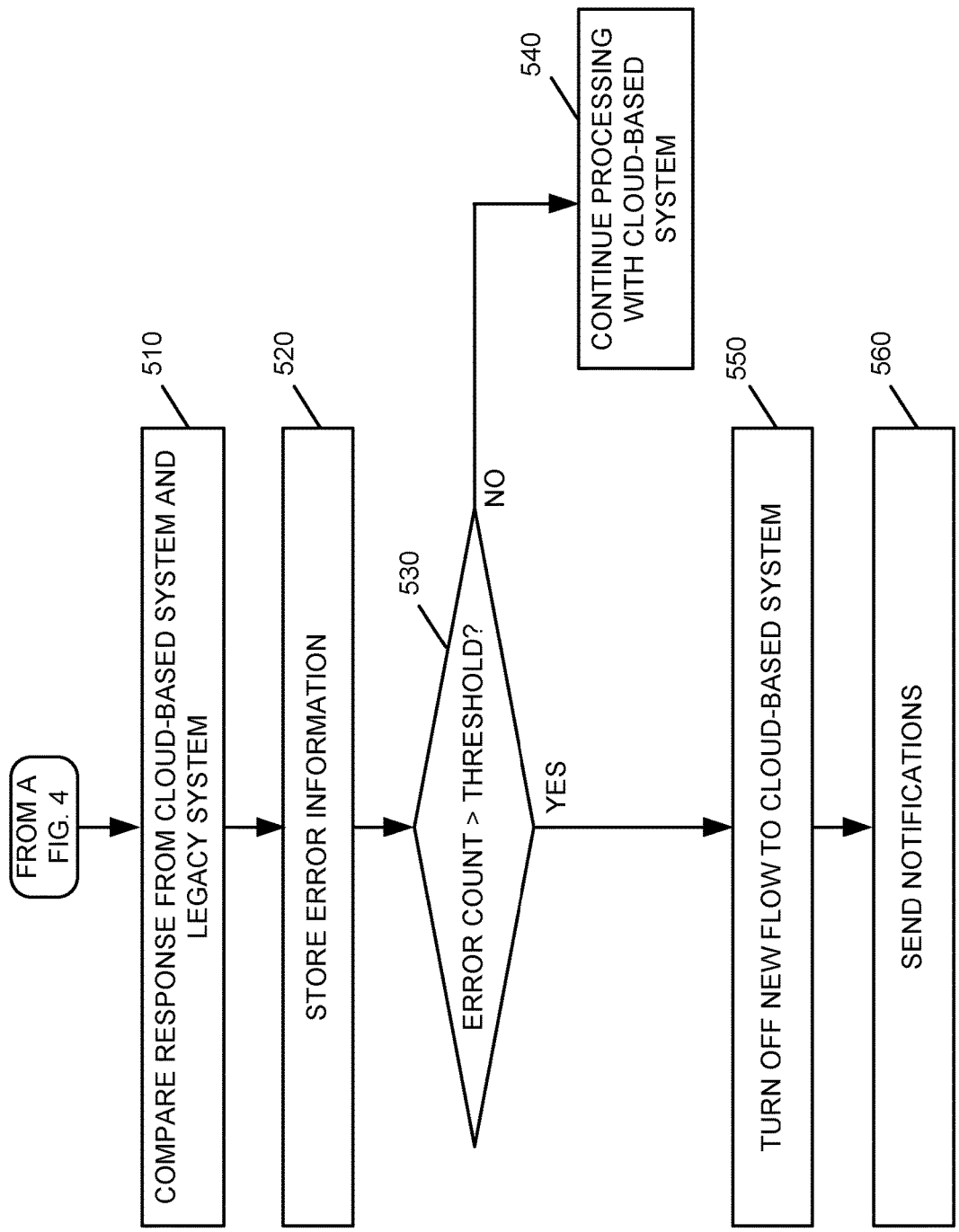

Verification system 160 may then compare the responses from cloud-based system 150 and legacy system 140 (FIG. 5, block 510). For example, if legacy system 140 generates the same response as cloud-based system 150 (e.g., an error, such as data not found), verification system 160 may determine that cloud-based system 150 is operating properly and/or at least as well as legacy system 140. In such an instance, the error (or inability to identify information in response to the query) generated by cloud-based system 150 may be caused by factors not associated with the operation of cloud-based system 150. For example, the initial query by the user may have resulted in the error (e.g., the customer entered an incorrect telephone number, identifier/password, etc.).

As described above, in an exemplary implementation, verification logic 310 may include an XML tool to perform an XML, analysis of output from cloud-based system 150 to determine if an error or potential error occurred. Verification logic 310 may also use the XML tool to compare the output of cloud-based system 150 with the output of legacy system 140. For example, verification system 160 may compare XML output from cloud-based system 150 and legacy system 140 in an element-by-element or line-by-line manner. In this manner, if a discrepancy occurs between the output of cloud-based system 150 and legacy system 140, verification system 160 may be able to determine if cloud-based system 150 generated an error when processing the request, as opposed to performing the same or at least as well as legacy system 140. For example, if the output of the comparison from verification system 160 indicates that legacy system 140 produced a response to a query (e.g., identified available service plan information in response to the request in the example above) that cloud-based system 150 was unable to generate, verification system 160 may determine that cloud-based system 150 was the cause of the error. However, if verification system 160 determines that legacy system 140 generated the same result as cloud-based system 150, verification system 160 may determine that no error occurred and that the problem may have been caused by the initial input containing erroneous data (e.g., an incorrect telephone number).

In an exemplary implementation, the responses from cloud-based system 150 and legacy system 140 may each include may include a correlation or request identifier to facilitate verification system 160 being able to perform comparisons. For example, when a request for information is received by front end 120, distribution system 130 may forward the request to cloud-based system 150 along with a correlation or request identifier. When verification system 160 identifies an error or potential error, verification system 160 may forward the original request received by front end 120 to legacy system 140, along with the correlation or request identifier. In this manner, when legacy system 140 generates a response (which includes the correction or request identifier), verification system 160 will be able to use the correlation/request identifier associated with the response to compare output from legacy system 140 to output from cloud-based system 150 associated with the same initial request.

If legacy system 140 generates a response to the communication that appears to be valid, this may indicate that the error was caused by processing at cloud-based system 150. In some implementations, if legacy system 140 generates a valid response to the query (e.g., no error occurred at legacy system 140), verification system 160 may provide (or signal legacy system 140 to provide) the response to the query to front end 120 for forwarding to user device 110. In addition, verification system 160 may store error information regarding the incident (block 520). For example, verification logic 310 may increment one or more error counts stored in threshold logic 330, as well as store information associated with the communication type, front end 120 or other information relevant to the error incident. As indicated previously, the error counts may be particular to the type of query/API call, time of day, type of service/subservice, etc.

For example, FIG. 6 illustrates an exemplary datastore 600 stored in threshold logic 330. Referring to FIG. 6, datastore 600 includes category code field 610, active field 620, legacy compare field 630, failover threshold field 640, error count field 650 and description field 660. Each entry 670 in table 600 corresponds to a particular front end 120/interface, API call, service, subservice, etc., associated with communications received by distribution system 130 and processed by legacy system 140 and/or cloud-based system 150. The format of datastore 600 is for illustrative purposes only, and may take the form of any other common data storage techniques.

Category code field 610 identifies a particular service and/or type of communication. Active field 620 indicates whether the service or type of communication is enabled in cloud-based system 150. Legacy compare field 630 indicates whether the comparison function performed by legacy system 140, described above to determine whether cloud-based system 150 is operating properly, is enabled. Failover threshold field 640 indicates an error count or threshold for the particular service. For example, in entry 670-1, the failover threshold corresponding to category code 8 is two, while for entry 670-2 corresponding to category code 320, the failover threshold is 30. In these scenarios, if the count for the particular service is greater than the value in failover threshold field 640, verification system 160 may initiate a failover or switch to legacy system 140 for some or all user device communications, as described in detail below. Error count field 650 indicates a current error count associated with processing by cloud-based system 150 for the particular category code. Description field 660 provides a description for the type of error, such as data not found, unexpected error, service validation error, external resource error, etc.

Although FIG. 6 shows exemplary fields of datastore 600, in other implementations, datastore 600 may include more or fewer fields containing other information than depicted in FIG. 6. For example, datastore 600 may include fields such as queue thresholds identifying an amount of time a communication may be queued in cloud-based system 150. In addition, although datastore 600 is described as being stored in verification logic 160, in other implementations, datastore 600 may be stored in other components of environment 100, such as within distribution system 130.

Returning to FIG. 5, verification system 160 may access datastore 600 and determine if the error count is greater than an error threshold for the particular type of error (block 530). For example, verification logic 310 and/or self-healing logic 340 may determine if the error count in field 650 for a particular type of inquiry, service or API call received via front end 120 and identified in field 610 exceeds the failover threshold stored in field 640. If self-healing logic 340 (or verification logic 310) determines that the error count is less than the error threshold in failover threshold field 640 (block 530—no), cloud-based system 150 continues processing incoming communications (block 540). If, however, self-healing logic 340 determines that the error count is greater than the failover threshold in field 640 (block 530—yes), self-healing logic 340 may "turn off" some or all communications to cloud-based system 150. For example, self-healing logic 340 may change the "on" designation in active field 620 to "off," indicating that cloud-based system 150 will not be forwarded communications for the particular service, API call, etc. In this manner, if verification system 160 determines that the error threshold for a certain system/interface has exceed a threshold, verification system 160 may automatically turn off that type of communication flow to cloud-based system 150. Subsequent communications for that interface/flow will be forwarded to legacy system 140. For example, distribution system 130 may access datastore 600 and forward the particular type of communications that have been turned off to legacy system 140.

In addition, if the communication flow to cloud-based system 150 is turned off, communication logic 350 may send notifications, such as email messages, instant messages, computer alerts, etc., to the appropriate personnel associated with operating cloud-based system 150 (block 560). Alerting personnel in this manner may allow the problems in cloud-based system 150 to be quickly resolved.

Figure 7:
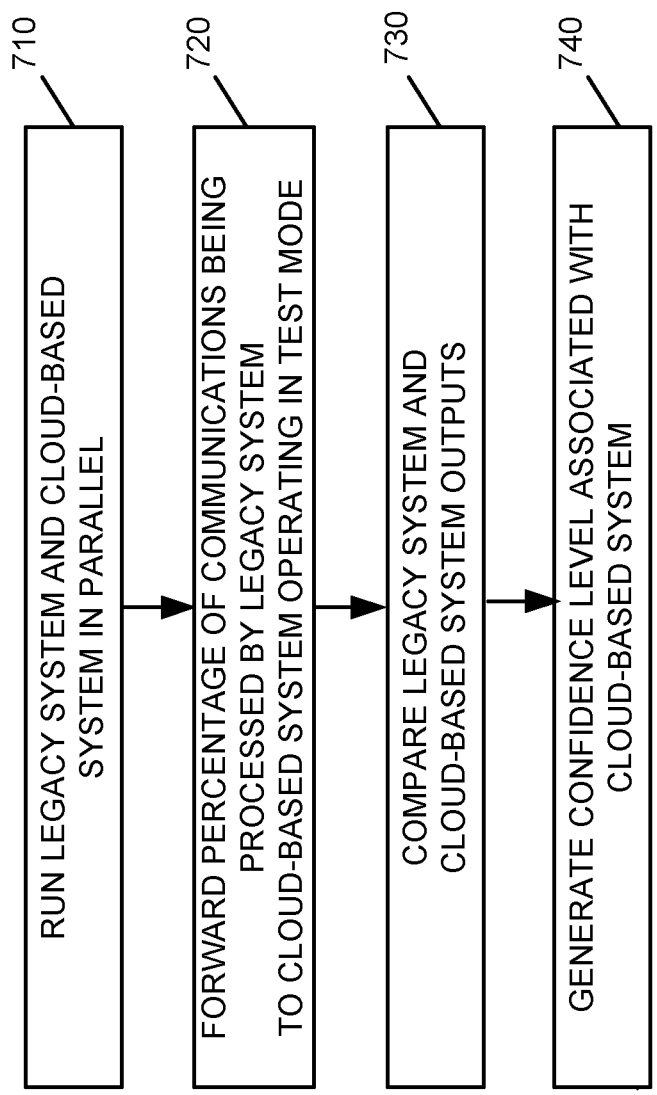
FIG. 7 is a flow diagram illustrating testing associated with the environment of FIG. 1.

In some implementations, cloud-based system 150 may be run in a parallel or shadow mode to ensure that cloud-based system 150 is operating properly with respect to handling communications. FIG. 7 is a flow diagram illustrating exemplary processing associated with running cloud-based system 150 in a parallel mode. Processing may begin by operating or running legacy system 140 and cloud-based system 150 in parallel (block 710). For example, legacy system 140 may be handling "live" communications from customers and providing output/results, while cloud-based system 150 may be operating in a parallel or shadow mode.

During the parallel mode, distribution system 130 may forward all communications received from front end 120 to legacy system 140, and forward all or a portion or percentage of such communications to cloud-based system 150 as well (block 720). During parallel or test mode, cloud-based system 150 may operate in the same manner as if it were solely responsible for processing communications. That is, cloud-based system 150 receives input/queries and generates output/results to be forwarded to user devices 110.

Verification system 160 may compare output from legacy system 140 with output from cloud-based system 150 (block 730). For example, similar to the comparison described above with respect to FIG. 5, verification logic 310 may determine whether the output from cloud-based system 150 is the same as the output from legacy system 140. By comparing output from legacy system 140 and cloud-based system 150 over a period of time, personnel associated with operating cloud-based system 150 may be able to determine whether cloud-based system 150 is ready to handle live communications.

In some implementations, verification system 160 may generate a confidence level or other indicator associated with operation of cloud-based system 150 (block 740). The confidence level indicator may be a numerical value that indicates whether cloud-based system 150 is operating at a certain accuracy level (e.g., 99%) or a qualitative indicator, such as "excellent," "ready to take live calls," etc. In this manner, personnel associated with cloud-based system 150 may be able to quickly determine whether a changeover from legacy system 140 to cloud-based system 150 may be performed.

As described above, verification system 160 compares responses/output from cloud-based system 150 and legacy system 140. In some implementations, if output from legacy system 140 is delayed with respect to the output generated by cloud-based system 150, verification system 160 may buffer the output of cloud-based system 150 along with the correlation identifier. When legacy system 140 forwards its output to verification system 160 with the correlation identifier, verification system 160 may retrieve the buffered output associated with the same request. In this manner, verification system 160 is able to track responses for comparison. In some instances, verification system 160 may determine whether legacy system 140 is able to handle requests as quickly or nearly as quickly as cloud-based system 150 prior to intercepting/forwarding requests to legacy system 140 to ensure that the comparisons do not unduly delay responses to requesters.

Implementations described herein provide for transitioning from a legacy computer system to a new cloud-based system in an efficient manner. For example, procedures associated with forwarding communications to the new cloud-based system may be identical to procedures associated with forwarding communications to the legacy system. In addition, by operating the cloud-based system in parallel with the legacy system, the entity associated with the cloud-based system ensures that the cloud-based system is ready to handle incoming communications without increasing error conditions or other operating problems. Still further, by verifying that errors associated with the cloud-based system do not exceed a threshold and automatically switching back to the legacy system provides the entity with additional protection against problems in the new cloud-based system.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to transitioning from a legacy computer system to a cloud-based system. In other implementations, the transition may be from any existing system to a new system, such as from one legacy mainframe to another mainframe, from one cloud-based system to another cloud-based system, etc.

Further, while series of acts have been described with respect to FIGS. 4, 5 and 7, the order of the acts and/or signal flows may be different in other implementations. Moreover, non-dependent acts may be implemented in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, by a service provider, a communication from a user device, wherein the communication is associated with a request for information from a user via the user device;
    determining, by the service provider, whether to forward the communication to a first computer system or a second computer system, wherein the first computer system is configured to replace the second computer system;
    forwarding the communication to the first computer system based on the determining;
    generating, by the first computer system, a first response to the communication;
    determining whether an error occurred when processing the communication at the first computer system;
    forwarding the communication to the second computer system, in response to determining that an error occurred;
    generating, by the second computer system, a second response to the communication;
    comparing the first response from the first computer system to the second response from the second computer system;
    determining whether processing the communication by the second computer system resulted in an error; and
    not incrementing an error count, in response to determining that processing the communication by the second computer system resulted in an error.

2. The method of claim 1, wherein the comparing and the determining whether processing the communication by the second computer system resulted in an error are performed by a verification system.

3. The method of claim 1, further comprising:
    incrementing an error count, in response to determining that processing the communication by the second computer system did not result in an error.

4. The method of claim 1, further comprising
comparing, by a verification system, an error count associated with processing by the first computer system to a threshold.

5. The method of claim 4, further comprising:
determining, by the verification system, that a number of errors associated with processing by the first computer system is greater than the threshold; and
automatically forwarding communications to the second computer system for processing by the second computer system, in response to determining that the number of errors is greater than the threshold.

6. The method of claim 1, wherein the first computer system is a cloud-based computer system and the second computer system is a legacy computer system, and
wherein the comparing comprises:
performing an extensible markup language comparison associated with the first response and second response.

7. The method of claim 1, further comprising:
identifying types of errors associated with processing by the first computer system;
analyzing, using machine learning, the identified types of errors; and
dynamically modifying error thresholds associated with the identified types of errors based on the analyzing.

8. The method of claim 1, further comprising:
storing error threshold information for a plurality of types of errors; and
initiating a changeover from the first computer system to the second computer system for processing at least some communications, in response to determining that a number of errors generated by the first computer system for a first one of the plurality of types of errors exceeds a threshold.

9. The method of claim 8, further comprising:
sending notifications to personnel associated with the first computer system in response to initiating the changeover.

10. The method of claim 1, further comprising:
operating the first computer system and second computer system in parallel, wherein the first computer system is operating in a test mode;
forwarding at least a portion of communications being processed by the second computer system to the first computer system; and
comparing outputs from the first and second computer systems.

11. The method of claim 10, further comprising:
determining whether the first computer system is operating properly based on the comparing.

12. The method of claim 10, further comprising:
generating a quantitative or qualitative indicator associated with the operation of the first computer system based on the comparing.

13. A system, comprising:
a memory; and
at least one device comprising at least one processor configured to execute instructions stored in the memory to:
receive a communication from a user device, wherein the communication is associated with a request for information from a user via the user device,
determine whether to forward the communication to a first computer system or a second computer system, wherein the first computer system is configured to replace the second computer system,
forward the communication to the first computer system based on the determining,
receive a first response to the communication generated by the first computer system,
determine whether an error occurred when processing the communication at the first computer system,
forward the communication to the second computer system, in response to determining that an error occurred,
receive a second response to the communication generated by the second computer system,
compare the first response from the first computer system to the second response from the second computer system,
determine whether processing the communication by the second computer system resulted in an error, and
not increment an error count, in response to determining that processing the communication by the second computer system resulted in an error.

14. The system of claim 13, wherein the at least one device comprises a verification system.

15. The system of claim 14, wherein the at least one device is further configured to:
increment an error count, in response to determining that processing the communication by the second computer system did not result in an error.

16. The system of claim 13, further comprising:
the first computer system, wherein the first computer system comprises a cloud-based system; and
the second computer system, wherein the second computer system comprises a legacy computer system,
wherein when comparing, the at least one device is configured to:
perform an extensible markup language comparison associated with the first response and the second response.

17. The system of claim 13, wherein the at least one device is further configured to:
compare an error count associated with processing by the first computer system to a threshold,
determine that a number of errors associated with processing by the first computer system is greater than the threshold, and
automatically forward communications to the second computer system for processing by the second computer system, in response to determining that the number of errors is greater than the threshold.

18. The system of claim 13, wherein the at least one device is further configured to:
store error threshold information for a plurality of types of errors in the memory, and
initiate a changeover from the first computer system to the second computer system for processing at least some communications, in response to determining that a number of errors generated by the first computer system for a first one of the plurality of types of errors exceeds a threshold.

19. A non-transitory computer-readable medium having stored thereon sequences of instructions which, when executed by at least one processor, cause the at least one processor to:
receive a communication from a user device, wherein the communication is associated with a request for information from a user via the user device;
determine whether to forward the communication to a first computer system or a second computer system;

forward the communication to the first computer system based on the determining, wherein the first computer system is configured to replace the second computer system;

receive a first response to the communication generated by the first computer system;

determine whether an error occurred when processing the communication at the first computer system;

forward the communication to the second computer system, in response to determining that an error occurred;

receive a second response to the communication generated by the second computer system;

compare the first response from the first computer system to the second response from the second computer system;

determine whether processing the communication by the second computer system resulted in an error; and not increment an error count, in response to determining that processing the communication by the second computer system resulted in an error.

20. The non-transitory computer-readable medium of claim 19, wherein the instructions further cause the at least one processor to:

compare an error count associated with processing by the first computer system to a threshold;

determine that a number of errors associated with processing by the first computer system is greater than the threshold; and automatically forward communications to the second computer system for processing by the second computer system, in response to determining that the number of errors is greater than the threshold.

* * * * *